United States Patent
Labes

[11] 3,853,785
[45] Dec. 10, 1974

[54] STABLE LIQUID CRYSTAL MIXTURES INCLUDING ANIL-TYPE NEMATIC COMPOUNDS

[75] Inventor: Mortimer M. Labes, Rosemont, Pa.

[73] Assignee: Temple University, Philadelphia, Pa.

[22] Filed: Nov. 6, 1972

[21] Appl. No.: 303,962

Related U.S. Application Data

[63] Continuation-in-part of Ser. No. 189,315, Oct. 14, 1971, Pat. No. 3,827,780.

[52] U.S. Cl. ............ 252/408, 23/230 LC, 260/566, 350/160
[51] Int. Cl. ............................................. C09k 3/00
[58] Field of Search .................... 252/408, 408 LC; 350/160 LC; 23/230 LC; 260/566 R, 566 F, 143

[56] References Cited
UNITED STATES PATENTS
3,720,623   3/1973   Cartmell et al. ............... 350/160 LC
3,773,747   11/1973   Steinsträsser ...................... 260/143

Primary Examiner—Ralph S. Kendall
Assistant Examiner—Bruce H. Hess
Attorney, Agent, or Firm—Paul & Paul

[57] ABSTRACT

Stable anil-type nematic liquid crystals of the formula

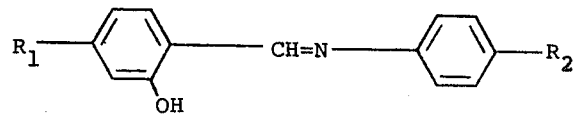

wherein $R_1$ and $R_2$ are each an alkyl, alkoxy, alkylester, aryl, aryloxy, arylester, aralkyl, carboxylic acid, halogen, nitro, cyano group or the like are combined with other liquid crystal materials to produce a liquid crystal composition of enhanced stability and/or broadened active temperature range. The liquid crystal mixtures of this invention, because of their excellent stability, are especially useful in light valves, optical display devices and similar applications which involve the modulation of light.

6 Claims, 3 Drawing Figures

STABLE LIQUID CRYSTAL MIXTURES INCLUDING ANIL-TYPE NEMATIC COMPOUNDS

This is a continuation-in-part application of my pending application Ser. No. 189,315, filed Oct. 14, 1971 now U.S. Pat. No. 3,827,780.

The invention described in that application was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention is concerned with a novel class of liquid crystal compositions including an anil-type nematic liquid crystal material. These compositions exhibit improved stability, and/or a broadened active temperature range as compared to other types of liquid crystalline material.

2. Description of the Prior Art

Liquid crystals are organic compounds which exhibit certain of the properties of conventional liquids and certain of the properties of conventional crystals. The molecules of a liquid organic crystal are of a linear configuration with the major axis of the molecules being substantially longer than the minor axis of the molecule. A liquid organic crystalline substance will flow and take the shape of a container in which it is placed as is characteristic of conventional liquids. A liquid organic crystalline substance also exhibits many properties of conventional crystals such as scattering of light and in some cases reflecting different colors depending upon the angle from which it is viewed. A common property of all liquid crystals is that they exhibit the phenomenon of birefringence or double refraction.

Thermotropic liquid crystals are conventionally classified into three generic classes, namely, smectic, nematic, and cholesteric. In the smectic class, the elongated molecules are aligned side by side in a series of distinct and separate layers. In the nematic class of liquid crystals, the elongated molecules are aligned parallel to each other along their major axis but the molecules are intermingled with each and do not form into separate layers as is characteristic of smectic liquid crystals. The cholesteric crystals are made up of nematic type layers, each succeeding layer being twisted by a small angle resulting in a helical array. An extensive discussion of the properties of liquid crystals is set out in the article "Liquid crystals" by James L. Fergason, Scientific American, August 1964.

Liquid crystals were known to exist for a long period of time but remained primarily a laboratory curiosity. However, relatively recently there has been an appreciation that the properties of liquid crystals could be used to advantage in various apparatus, such as electro-optical elements, for example, light valves and optical display devices which involve modulation of light. It has been found as reported by George H. Heilmeier in "Liquid Crystal Display Devices," Scientific American, 222, 100 (1970), that when a thin film of a liquid crystal material is sandwiched between two sheets of glass, that the film is clear. However, when an electric field is applied to a predetermined area of the film, the film of liquid crystals in the predetermined area will become turbulent and scatter light. By varying the size and shape of the turbulent areas optical images can be formed. Since the optical images are produced by scattering of ambient light, as opposed to conventional cathode tubes which produce their own light, the images have more of the appearance of a printed page than a televised image. Further, since liquid crystals reflect ambient light rather than generate light, they can be used under a wide range of lighting conditions including direct sunlight which wash out images produced by conventional light generating devices. In addition, since the light which is reflected is ambient light rather than generated light, a considerably lesser amount of energy is required to operate the devices.

Nematic type liquid crystals are especially useful in optical display devices. When an electric field is applied to the nematic liquid crystals in a particular area, a combination of electrohydrodynamically induced motion and direct dipole alignment causes a significant amount of disturbance aligning the molecules in a new configuration. This effect is referred to as dynamic scattering and results in the optical image produced having the clear sharp definition, as is required in most optical display devices. Nematics may be used in other electro-optical modes of display called field effects; a brief summary of five electro-optical effects observed in nematics can be found in E. Stepke - Electro-optics Systems Design, Vol. 4, No. 2, page 20 (1972).

Once the voltage is shut off, the electric field is removed and the nematic type liquid crystals revert to their former position. The image is thus erased. Various methods can be used to preserve the semi-permanent images on the electro-optic display devices such as using a combination of nematic liquid crystals and cholesteric liquid crystals or by using a dyestuff along with the nematic liquid crystal material.

Typical liquid crystal devices are made by placing a thin film of the nematic liquid crystal material between two plates of glass, quartz or the like, each of which on one side has been coated in preselected areas with a conductive material. At least one of the coatings should be transparent for purposes of viewing the electro-optical image. If the device is to be used to control light transmissions both electrodes must be transparent. However, when the device is to be used as an optical display device, the rearward electrode is preferably highly reflective so as to intensify the image. The preselected areas are connected to suitable electrical leads so that a given section can be energied as required to produce the desired optical image.

As can readily be appreciated, the electro-optical devices using nematic liquid crystals have great potential. However, to date, considerable problems have been encountered in the manufacture of these devices so that they will operate over an extended period of time especially when they are subjected to a relatively large number of electrical transformations generally required in devices of this type. The problem has basically been that the nematic liquid crystal compound heretofore suggested either have been relatively unstable or have had a limited temperature range of operation.

The compounds which generally exhibits nematic liquid crystal characteristics are linear in molecular structure. Numerous compounds have heretofore been suggested. Typical compounds are disclosed in Williams U.S. Pat. No. 3,322,485 in which various derivatives of dienoic acid, azoxybenzene, benzoic acid, and the like are disclosed as being suitable.

French Pat. No. 1,537,000 further discloses the use of anil-type compounds of the general formula

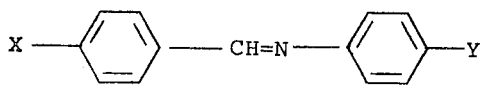

wherein X and Y are substituents such as alkoxy and alkylesters for use in liquid crystal optical display devices.

Unfortunately, however, all of the compounds heretofore suggested have to a greater or lesser degree proven to be unstable when used in liquid crystal electro-optical dispaly devices and/or limited with respect to their active temperature range.

Accordingly, it is an object of this invention to overcome the aforementioned problems and difficulties of the prior art.

An additional object of this invention is to provide mixtures of stable nematic type liquid crystal compounds with other types of liquid crystal compounds which are suitable for use in electro-optical display devices.

Other objects and advantages of this invention will become further apparent hereinafter.

BRIEF SUMMARY OF THE INVENTION

The object of this invention has been achieved by providing a mixture of a novel class of o-hydroxy substituted anil-type nematic liquid crystals, which have improved stability (as disclosed and claimed in my above-referenced patent application), with compounds of certain other types of liquid crystalline material.

DESCRIPTION OF THE PREFERRED EMBODIMENTS

Figure 1:
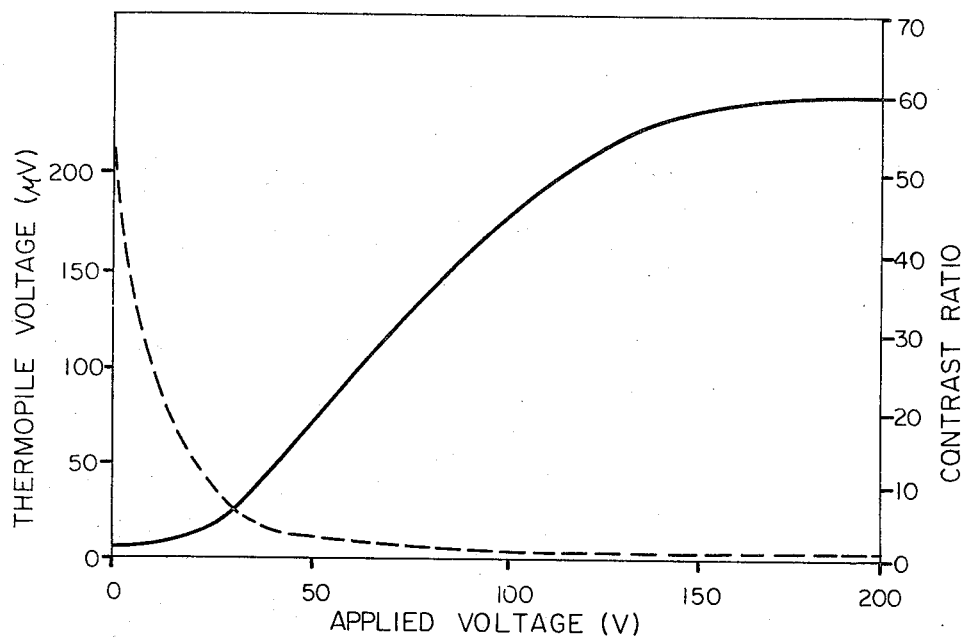
FIG. 1 is a graph showing the electro-optical properties of a typical nematic liquid crystal which forms one component of the mixtures of this invention.

A class of compounds which has been found to have improved stability are represented by the formula

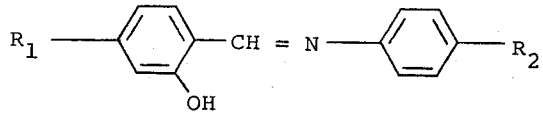

wherein $R_1$ and $R_2$ are each a member selected from the group consisting of alkyl, alkoxy, and alkylester having 1–20 carbon atoms and preferably 1–7 carbon atoms; alkylene having 2–20 carbon atoms and preferably 2–7 carbon atoms; aryl, aryloxy and arylester having 6–15 carbon atoms; carboxylic acid; halogen; nitro and cyano with at least one of the above groups $R_1$ and $R_2$ being an organic radical as defined above.

The groups $R_1$ and $R_2$ are selected so that the compound of Formula I is a liquid crystal and exhibits nematic hehavior at a temperature at which the electro-optical device in which the compound is utilized will be operated. In general, the electro-optical devices are preferably operated from below room temperature to somewhat elevated temperatures, for example, $-5°$-$100°C$. It has been found that the lower molecular weight compounds included within the scope of Formula I, such as those in which the groups $R_1$ and $R_2$ are lower alkyls or lower alkoxys, are liquid crystals and exhibit nematic crystalline behavior within, although not throughout the above temperature range.

It has also been found by using mixtures of the compound of the formula that it is possible to form eutectics which have substantially lower, higher or broader effective temperature ranges in which they can be used as compared to the individual compounds comprising the eutectic.

In accordance with the present invention, it has also been found that mixtures of the compounds of Formula I with certain other classes of nematic liquid crystals tend to be more stable than the latter compounds, or to be effective as nematic liquid crystals through broader temperature ranges than the former compounds. Obviously, the mixtures of this invention must be mixtures of miscible compounds. In general, the classes of compounds with which the compounds of Formula I may be combined are the N-p-alkoxybenzylidene-p-alkylanilines and p-alkoxy-p'alkylazoxybenzenes. Generally, these classes are thought to extend from $C_1$ to $C_6$ for the alkyl substituent of the alkoxy and for the alkyl substituent per se. However, more commonly methoxy or ethoxy is the alkoxy and the alkyl is in the range $C_1$–$C_5$.

The anil-type nematic crystal compounds and compositions of Formula I noted above, have excellent chemical stability as compared with the compounds heretofore employed, especially in comparison with anil-type compounds such as those disclosed in French Pat. No. 1,537,000. The reasons for the exceptional stability of the anil-type compounds of this invention is believed to be due to the presence of the hydroxy group in the ortho position. The hydroxy group hydrogen bonds with the nitrogen atom of the anil linkage to form a compound which can be represented by the formula

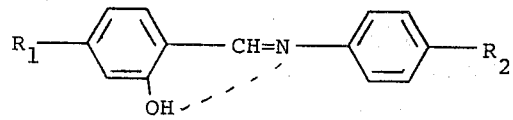

The hydrogen bonded ring thus formed is chemically stable. When the o-hydroxy group is not present in the ring, the compound is readily broken at the anil linkage and the nematic crystalline properties of the compound are destroyed.

The compounds of Formula I used in this invention are prepared in a conventional manner. A para-substituted o-hydroxy benzaldehyde is prepared in accordance with the general procedure described in Zemplen et al, Acta Chim, Hung.22,449 (1960). Equimolar quantities of the para-substituted o-hydroxybenzaldehyde and a para-substituted aniline are dissolved in absolute ethanol, and then blended and heated at the boiling point of the mixture for 30 minutes. The mixture is cooled to 0°C at which point, a crystalline solid forms. The solid is recovered and recrystallized from either ethanol or another suitable solvent such as hexane. The process is shown by the following formula

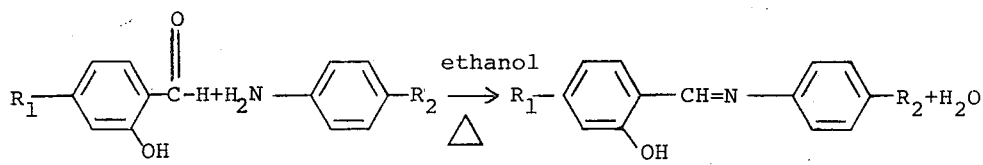

For purposes of the present invention, the compounds thus produced are combined, in proportions on the order of 50—50, with a compound from one of the above-cited classes, namely N[p-alkoxybenzylidene]-p-alkylanilines and p-alkoxy-p'alkylazoxybenzenes. Compounds of particular interest in the first of these classes include N-(p-ethoxybenzylidene)-p-n-butylaniline (EBBA) and N-(p-methoxybenzylidene)-p-n-pentylaniline (MPBA). Compounds of particular interest in the second of these classes include the methoxy and ethoxy substituted and the n-butyl and n-pentyl substituted compounds. The structural formulas of these compounds are as follows:

N-p-alkoxybenzylidene-p-alkylaniline

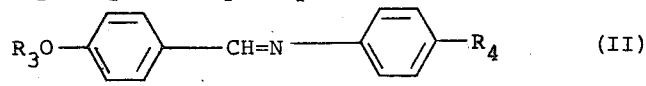    (II)

EBBA

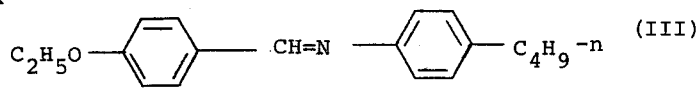    (III)

MPBA

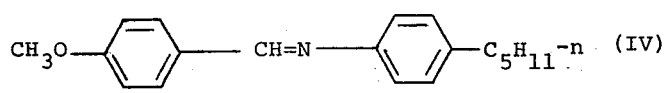    (IV)

p-alkoxy-p'alkylazoxybenzene

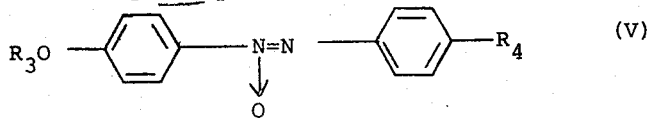    (V)

or

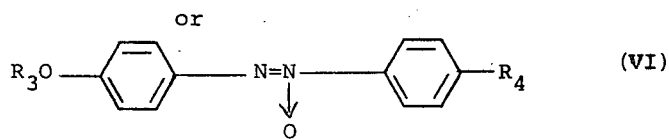    (VI)

(In each case, $R_3$ represents the alkyl portion of the alkoxy substituent and $R_4$ represents an alkyl substituent).

Mixtures of compounds from these classes with the compounds of Formula I produce very surprising results.

For example, the methoxy, n-butyl substituted compound of Formula I, i.e., N-(o-hydroxy-p-methoxybenzylidene)-p-n-butylaniline (OHMBBA) has a nematic activity temperature range of 44.7° to 64.5°C.

When combined, in a 50—50 proportion, with EBBA, a mixture having a nematic activity temperature range of 7–70°C results at a composition point where the components are in roughly equal proportions. Similarly, with MPBA, this range is 5°–62°C at a composition proportion of 40 – 60 percent, OHMBBA-MPBA. With one commercially available p-alkoxy-p'alkylazoxybenzenes known as "Nematic Phase V," the range of the mixture is < −20° to 70°C. "Nematic Phase V," which produces a desirable active temperature range in mixtures with the compounds of Formula I, such as OHMBBA, in proportions of about 40–60 weight percent (preferably about 50 percent) is itself a mixture, in approximately equal proportions, of the compounds of Formula V and VI above wherein $R_3$ is methyl and $R_4$ is n-butyl.

Even more surprisingly, however, these mixtures in some cases exhibited superior stability when compared to that of the nematic compounds with which the Formula I compounds were combined. Since one would ordinarily expect a mixture to be no more stable than the least stable of its components (assuming no interaction of the components), one must conclude that there is some unknown and certainly unpredictable interaction between the components of the mixtures of this invention. It is hypothesized that some form of intermolecular hydrogen bonding occurs.

These mixtures therefore represent useful nematic liquid crystal compositions of significant commerical potential.

Figure 2:
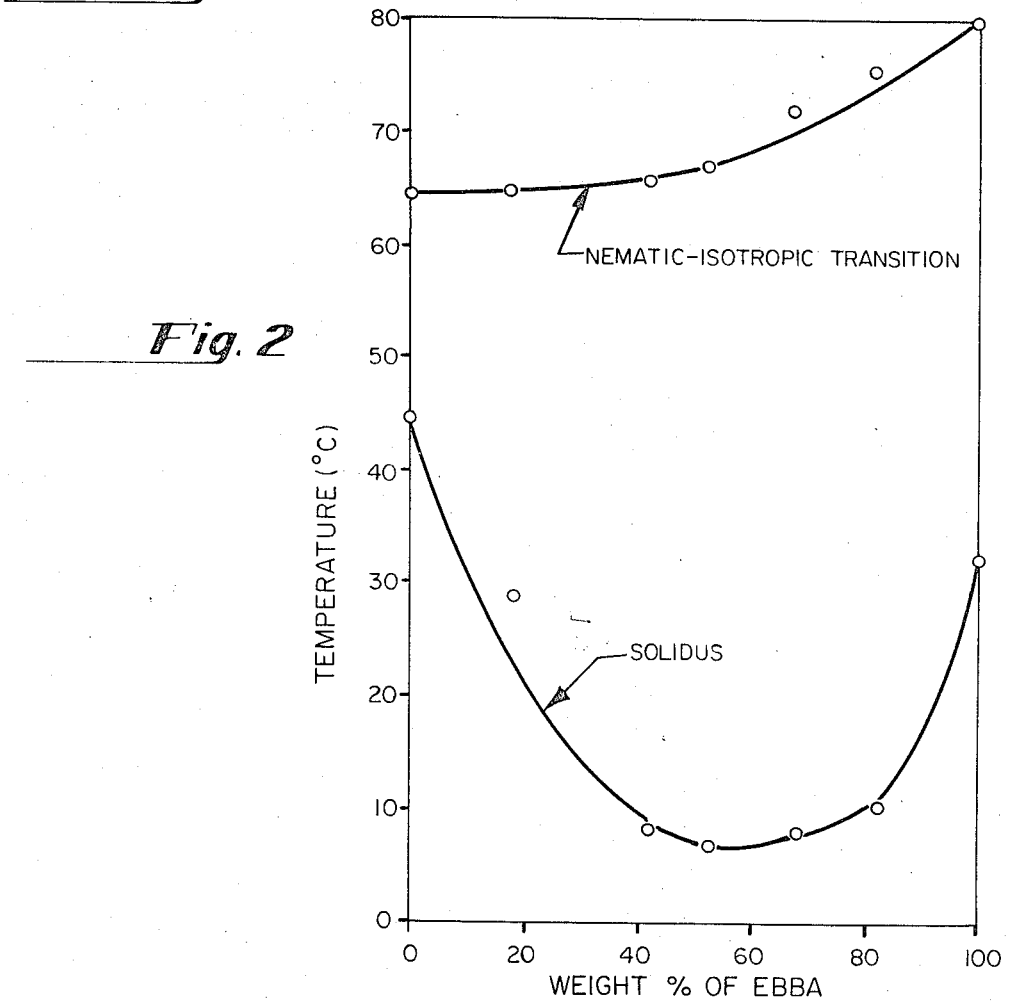
FIGS. 2 and 3 are liquid-solid phase diagrams of two mixtures within the scope of the present invention.
Figure 3:
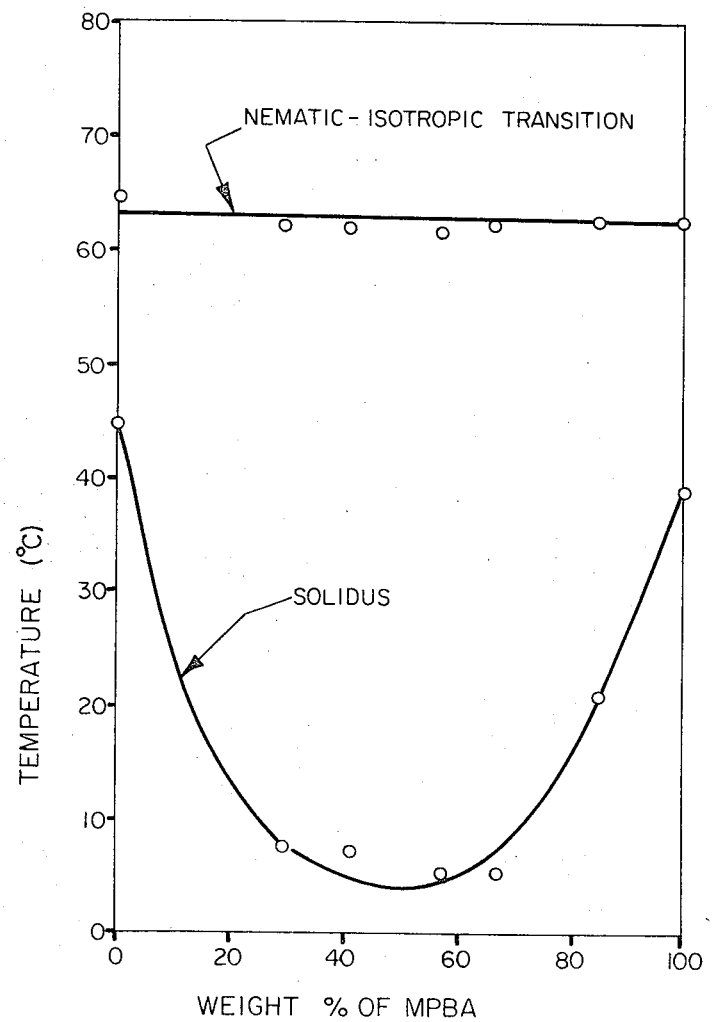

The phase diagrams of the OHMBBA-EBBA and the OHMBBA-MPBA systems are shown in FIGS. 2 and 3. Both systems show nematic behavior over their entire composition range. The active temperature range for both of these systems is seen to be greatest for mixtures consisting of from 40 percent to 60 percent of each of the components with the maximum for the OHMBBA-EBBA system being at approximately 60 weight percent EBBA and for the OHMBBA-MPBA system, at about 50 weight percent MPBA. The most useful range of proportions is probably that in which the minimum of the nematic activity temperature range is below 20°C. For the OHMBBA-EBBA system, this is approximately 20–95 weight percent EBBA; for the OHMBBA-MPBA system, is about 15–80 weight percent MPBA.

By way of illustrating the stability of these systems, using the OHMBBA-EBBA system as an example, a sample of 50-5 mixture of this system, disposed in a 12.5 μ film between tin oxide electrodes, was stored in air, exposed and unsealed, for a month with no change in electro-optic characteristics. Ordinarily, a similar sample of EBBA would be expected to be substantially degraded after a comparable test.

I claim:

1. A nematic liquid crystal composition useful in electro-optical devices consisting of a miscible mixture of
   a. a first nematic liquid crystal material consisting of the compound N-(o-hydroxy-p-methoxybenzylidene)-p-n-butylaniline, and
   b. a second nematic liquid crystal material consisting of the compound N-(p-ethoxy-benzylidene)-p-n-butylaniline
   wherein each nematic liquid crystal material is present in an amount sufficient to stabilize and/or broaden the active temperature range of the composition.

2. A nematic liquid crystal composition useful in electro-optical devices consisting of a miscible mixture of
   a. a first nematic liquid crystal material consisting of the compound N-(o-hydroxy-p-methoxybenzylidene)-p-n-butylaniline, and
   b. a second nematic liquid crystal material consisting of the compound N-(p-methoxybenxylidene)-p-n-pentylaniline
   wherein each nematic liquid crystal material is present in an amount sufficient to stabilize and/or broaden the active temperature range of the composition.

3. A composition, as recited in claim 1, wherein said second nematic liquid crystal material comprises 20 – 95 weight percent of the composition.

4. A composition, as recited in claim 2, wherein said second nematic liquid crystal material comprises 15 – 80 weight percent of the composition.

5. A nematic liquid crystal composition useful in electro-optical devices consisting of a miscible mixture of
   a. a first nematic liquid crystal material consisting of the compound N-(o-hydroxy-p-methoxybenzylidene)-p-n-butylaniline, and
   b. a second nematic liquid crystal material consisting of the compound-mixture

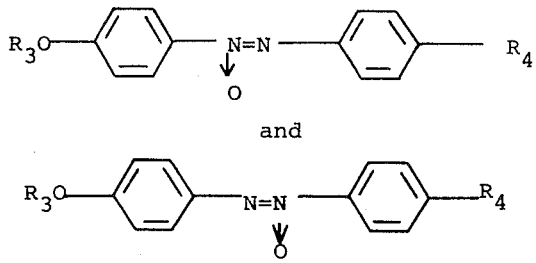

and where $R_3$ is methyl and $R_4$ is butyl, and wherein the weight proportion of said first material to said second material is from 40:60 to 60:40.

6. A nematic liquid crystal composition useful in electro-optical devices consisting of a miscible mixture of
   a. a first nematic liquid crystal material consisting of a compound of the formula

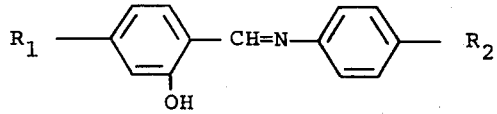

where $R_1$ is an alkoxy having 1 to 7 carbons, and $R_2$ is an alkyl having from 1 to 7 carbons, and
   b. a second nematic liquid crystal material selected from the group consisting of N-[p-alkoxybenzylidene]-p-alkylaniline and p-alkoxy-p-alkylazoxybenzene, in which the alkoxy and the alkyl substituents have from 1 to 6 carbons
   and wherein the weight proportion of said first material to said second material is about 50:50.

* * * * *